Patented Mar. 1, 1932

1,847,513

UNITED STATES PATENT OFFICE

WINFRID HENTRICH AND MAX HARDTMANN, OF WIESDORF-ON-THE-RHINE, AND ANTON OSSENBECK, OF COLOGNE-MULHEIM, GERMANY, ASSIGNORS TO GENERAL ANILINE WORKS, INC., OF NEW YORK, N. Y., A CORPORATION OF DELAWARE

PROCESS FOR PREPARING DIAZONIUM FLUORO-SULPHONATES

No Drawing. Application filed December 27, 1928, Serial No. 328,848, and in Germany January 6, 1928.

The present invention relates to the manufacture of diazonium fluoro-sulphonates by treating any desired diazonium compounds with fluoro-sulphonic acid.

In accordance with the invention the fluoro-sulphonates of diazonium compounds which may be represented by the general formula

wherein R stands for the residue of any diazotizing component, can be obtained in excellent yield by causing fluoro-sulphonic acid and any diazonium salt to react upon each other, preferably in about molecular quantities, in adding the fluoro-sulphonic acid to an aqueous solution of the diazonium compound at room temperature or while cooling. The diazonium fluoro-sulphonates immediately or after cooling separate generally in well formed, whitish to dark crystals. They are filtered and carefully dried. Our new compounds are not sensitive to percussion and friction; on heating they decompose slowly without exploding and their inflammability is extremely small. They are readily soluble in water and in solvents containing water.

The concentration of the aqueous solution of the diazonium-compound may be varied within wide limits, depending on the specific diazo-compound used, but we prefer to carry out our process with nearly concentrated solutions in order to facilitate the separation of the new compounds.

The following examples will illustrate our invention, without limiting it thereto:

*Example 1.*—28.3 parts by weight of 4-chloro-2-amino-toluene are dissolved in 60 parts by weight of crude hydrochloric acid and diazotized in the customary manner with a concentrated solution of 14 parts by weight of sodium nitrite (100%). 45 g. of a 40% fluoro-sulphonic acid are then added. On cooling, small crystals precipitate which are filtered and dried in a suitable manner, preferably in vacuo. The diazonium fluoro-sulphonate thus obtained is readily soluble in cold water. The yield amounts of 85–90% and can be further increased by employing a larger excess of fluoro-sulphonic acid.

Instead of the diazonium compound of 4-chloro-2-amino-toluene, any desired other diazonium compounds of benzene or of its homologues and substitution products can be employed.

*Example 2.*—56 parts by weight of 4-aminoazobenzene are dissolved in an equal quantity of hot glacial acetic acid, and the solution is stirred into 300 parts by volume of 10% hydrocholoric acid; diazotization is carried out in the customary manner with a slight excess of a concentrated sodium nitrite solution. A slight excess of the calculated amount of 40% fluoro-sulphonic acid is then added and the mixture is stirred for a little while. The resulting precipitate is filtered and dried by heating in vacuo. 87 parts by weight of diazonium fluoro-sulphonate are obtained, equal to the theoretically calculated quantity. The compound is moderately soluble in cold water, readily soluble in hot water and moderately soluble in organic solvents.

Instead of the diazoazobenzene other disazoazo compounds, such as for example, the aminoazo compounds obtained from 2-diazophenetol and 1-aminonaphthalene as well as aminopolyazo compounds, can also be used.

*Example 3.*—22.3 parts by weight of 1-aminoanthraquinone are diazotized in 33 parts by volume of sulfuric acid monohydrate with 7 parts by weight of 100% sodium nitrite at 70–80° C. The reaction mixture is poured into cold water and then diluted with water of 60° C. to 750 parts by volume. After filtration, to the filtrate 28 parts by weight of 40% fluoro-sulphonic acid are added. The beautifully crystalline diazonium fluoro-sulphonate is immediately precipitated; it is filtered and dried with heating. The yield amounts to about 90% of the theory.

Instead of the diazonium compound of 1-amino-anthraquinone, there can also be used the diazonium compounds of homologues or substitution products thereof, also quite generally, the diazonium compounds of the derivatives of other polynuclear carbocyclic or mono and polynuclear heterocyclic and mixed carboheterocyclic systems, provided that the base materials contain at least one diazotizable amino group.

We claim:

1. The process for preparing diazonium fluoro sulphonates which comprises adding fluoro sulphonic acid to an aqueous solution of a diazonium salt at room temperature, filtering off the diazonium fluoro sulphonate separated and carefully drying the same.

2. The process for preparing diazonium fluoro sulphonates which comprises causing about molecular quantities of fluoro sulphonic acid and a diazonium salt in an aqueous solution to react upon each other at room temperature, filtering off the diazonium fluoro sulphonate separated and carefully drying the same.

3. The process for preparing diazonium fluoro sulphonates which comprises causing molecular quantities of fluoro sulphonic acid and a diazonium salt in a nearly concentrated aqueous solution to react upon each other at room temperature, filtering off the diazonium fluoro sulphonate separated and carefully drying the same.

4. The process which comprises causing molecular quantities of fluoro sulphonic acid and diazotized 1-amino-anthraquinone to react upon each other in aqueous solution at room temperature, separating the crystals formed, and carefully drying same.

In testimony whereof we have hereunto set our hands.

WINFRID HENTRICH. [L. S.]
MAX HARDTMANN. [L. S.]
ANTON OSSENBECK. [L. S.]